Sept. 6, 1927.
W. T. FOLEY
1,641,379
STORAGE BATTERY SEPARATOR
Filed Feb. 20, 1925
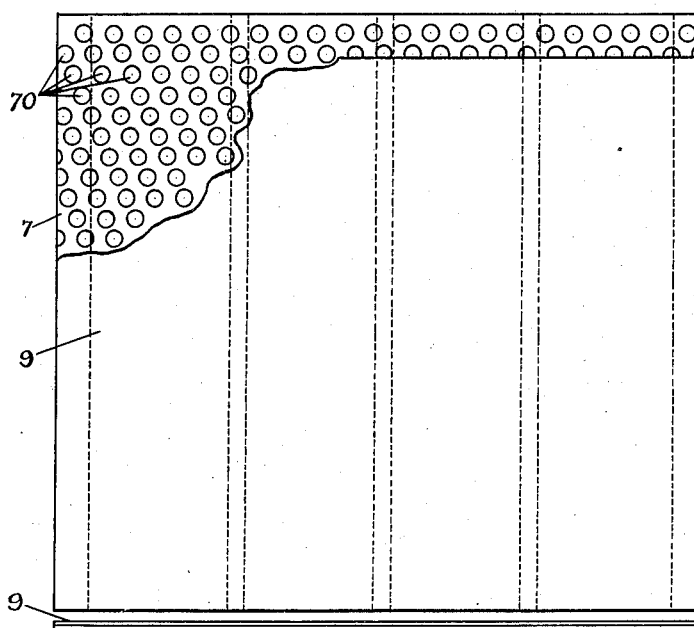
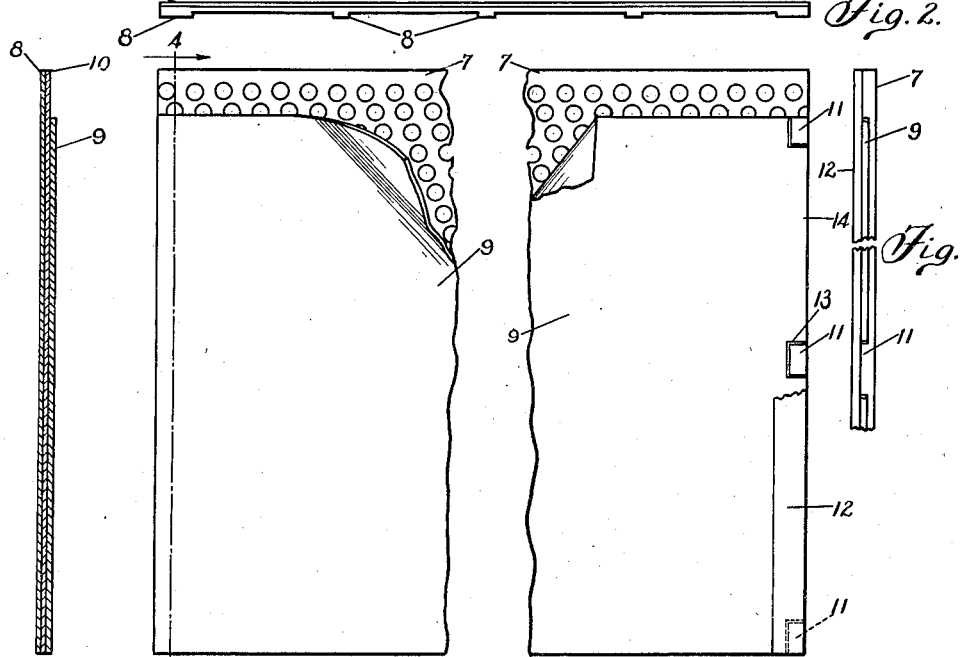
Inventor
William T. Foley
By Murray & Gugelter
Attorneys Patented Sept. 6, 1927.

1,641,379

UNITED STATES PATENT OFFICE.

WILLIAM T. FOLEY, OF CINCINNATI, OHIO.

STORAGE-BATTERY SEPARATOR.

Application filed February 20, 1925. Serial No. 10,667.

This invention relates to storage battery separators, and has for an object the provision of an inexpensive and efficient battery separator.

Another object is to provide a battery separator which comprises a porous and nonporous member which may be expeditiously assembled and which after a period of use will assume the characteristics of a single separator member.

These and other objects are attained by the means described herein and disclosed in the accompanying drawings, in which:

Fig. 1 is an elevational view of a separator of my invention, parts being broken away.

Fig. 2 is an end view of the device shown in Fig. 1.

Fig. 3 is a fragmental detail view of the plate shown in Fig. 1.

Fig. 4 is a cross sectional view on line 4—4 of Fig. 3.

Fig. 5 is a fragmental detail view of a modification of the device of my invention.

Fig. 6 is a fragmental side view of the device shown in Fig. 5.

The device comprises a rubber separator plate 7 provided with the usual spacing ribs 8 upon its one side and having small perforations 70 extending through the plate and located substantially over the entire area of the plate. The spacing ribs 8 are adapted to be positioned in the battery against the positive plates thereof, with the negative plate in abutment with a porous or fibrous covering 9 applied to the flat face of the plate. The porous member 9 may comprise a sheet of blotting paper, cloth, wood pulp or the like, and is adapted to be retained thereon by securing said porous member 9 along the lateral edges only of the plate 7. In the simplest form of the invention, this securing of the porous member to the perforated member of the separator is accomplished by applying a suitable acid resisting cement 10, such as rubber cement along the lateral edge of the perforated member 7 and applying the porous or fibrous sheet 9 thereto. The sheet 9 will normally extend from the bottom of the plate to within about one-half inch of the top of the plate and in this way will be amply protected against damage by the insertion of a hydrometer, when such plate is assembled in a battery.

As shown in Figs. 5 and 6, the perforated rubber plate 7 is supplied with lugs 11 at spaced intervals along the lateral edges thereof and a narrow strip 12 of similar material is secured thereto. By means of this structure a sheet of fibrous material 9, provided with cut-away portions or notches 13 to correspond with the lugs 11, may be inserted between the plate 7 and the strip 12, the flexibility of the porous member permitting such insertion. In this form the perforated rubber separators 7 and the sheets of fibrous material 9 may be separately made and handled and the sheets 9 may have the edges 14 readily inserted between the strip 12 and plate 7 at the time of assembling the battery.

The operation of the device is as follows:

The separators as disclosed in Fig. 5 are inserted between the positive and negative plates, of a storage battery, with the ribs 8 in abutment with the positive plates. The fibrous material 9 will, in the case of the separator shown in Fig. 3, be in absolute abutment with the negative plate of the battery; while in the case of the separator shown in Fig. 5, the fibrous sheet 9 will be slightly spaced therefrom at least along its edges, but the plates will adapt themselves to exert the desired pressure. When the electrolyte is poured into a storage cell, the fibrous sheet 9 will immediately become quite soft. The pressure of the battery plates upon the separator will tend to force the softened fibrous material into the perforations 70, and will permit a free flow of current with a minimum of internal battery resistance and at the same time will tend to prevent sloughing of the plate and will preclude the movement of sediment through the perforations 70 in the plate and will also prevent what is commonly known as "treeing" between the battery plates. In the preferred form, when using a good grade of blotting paper, and a thin ribbed and perforated sheet of rubber, a highly efficient and very inexpensive separator is provided. In either of the forms shown, the over-all thickness of the separator can be made to conform to the approved standards, so as to provide the required space for the escape of gases from the positive plate.

In the form disclosed in Fig. 3 of the drawings, the porous member 9 of the separator may be applied by means of different substances to accommodate the different materials, of which the member 9 may be formed. For example, in applying blotting paper, which is the most economical, rubber cement or the like may be used, or a fabric may be secured to the plate 7 by vulcanizing it thereon.

It will be readily apparent that the novel arrangement of the perforate insulating plate 7 and the porous member 9 eliminates the need for complicated manufacturing operations, and that the resultant separators as described herein, will, after being placed in a battery cell, become in fact, a one piece separator possessing all the advantages of that type of separator.

What I claim is:

1. A storage battery separator, comprising a perforate insulating sheet, and a sheet of homogeneous, structurally weak porous material mounted on the first mentioned sheet, the porous sheet being adapted, when placed in a storage battery to have its mass pressed into the perforations in the first mentioned sheet by the normal pressure of storage battery plates.

2. As a new article of manufacture, a storage battery separator comprising a perforated sheet of insulating material having ribs disposed on one side thereof and a sheet of homogeneous structurally weak fibrous material disposed against the opposite side of said sheet of insulating material and adapted to be forced into the perforations in said insulating material by the normal pressure of battery plates whereby a single separator element is formed.

3. In a storage battery separator the combination of a perforate plate of rigid insulating material and a sheet of homogeneous fibrous material of such structural composition as to be compressible into the perforations in the insulating material under pressure of battery plates whereby the perforations in the insulating material are individually filled with fibrous material to preclude movement of battery sediment through the perforations while permitting a flow of battery current with a low internal battery resistance.

In testimony whereof, I have hereunto subscribed my name this 17th day of February, 1925.

WILLIAM T. FOLEY.